W. R. KINNEAR.
METALLIC KEG.
APPLICATION FILED APR. 23, 1912.
1,092,999.
Patented Apr. 14, 1914.
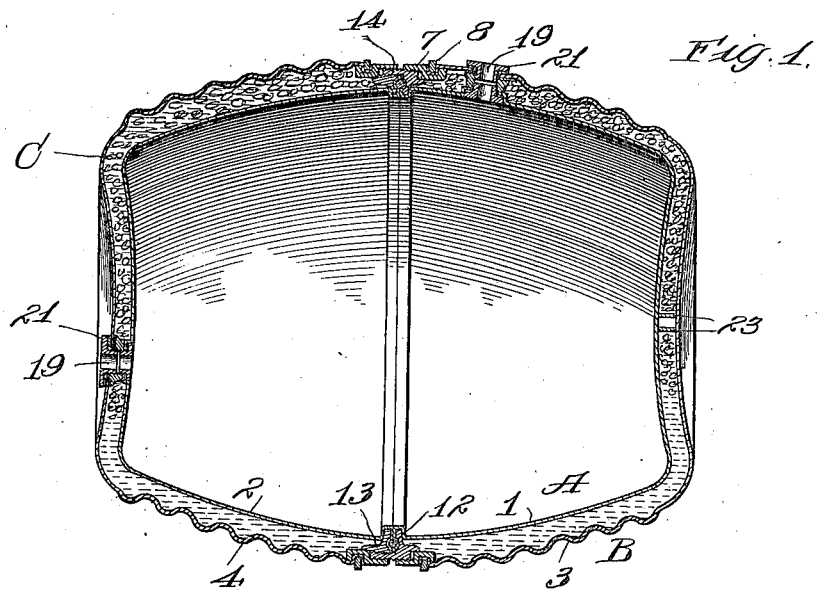
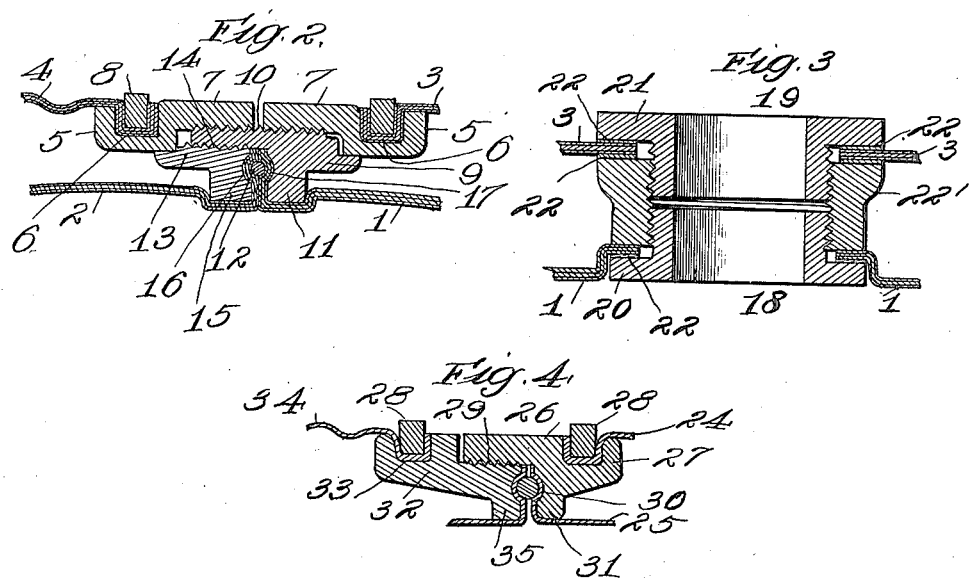
WITNESSES
INVENTOR
William R. Kinnear
Attorney

UNITED STATES PATENT OFFICE.

WILLIAM R. KINNEAR, OF DETROIT, MICHIGAN.

METALLIC KEG.

1,092,999. Specification of Letters Patent. Patented Apr. 14, 1914.

Application filed April 23, 1912. Serial No. 692,630.

*To all whom it may concern:*

Be it known that I, WILLIAM R. KINNEAR, a citizen of the United States, residing at Detroit, in the county of Wayne and State of Michigan, have invented certain new and useful Improvements in Metallic Kegs, of which the following is a specification.

Many efforts have been made to construct a sheet metal beer keg that will not only be sanitary, but at the same time be free from leakage and protected on the inside against chemical reaction between the beer and the metal. Metal kegs with vitreous lining have been constructed, but the vitreous lining has been destroyed by shocks on the exterior of the keg incident to the keg being dropped while being handled, and these kegs were of such construction that it is impossible to ascertain whether or not the vitreous lining had been damaged without destroying the keg.

The object of my invention is to provide a beer keg with an inner and an outer shell, each shell being made in two pieces and joined together at the center with a liquid proof joint, the inner shell being enameled on the inside and the outside; the connection joining the two sections of each shell being such that the shells may readily be taken apart and examined, and if the enamel should in any way become defective, the inner shell can be removed from the outer and re-enameled.

A further object of my invention is to provide a liquid shock absorber and a non-conductor in the space between the inner and outer shells, which distributes any shock which may be given to the keg throughout the entire area of the absorber and thus protects the inner shell from said shocks and preserves the enamel intact, the non-conductor preventing the passage of heat.

A further object of my invention is to construct the joint between the sections of each shell in such manner that the securing means is in the space between the two shells, so that the inner face of the inner shell presents an unbroken enameled surface; and with these and other objects in view, my invention consists of the parts and combination of parts as will be hereinafter more fully pointed out.

In the drawing—Figure 1 is a longitudinal section of a liquid container embodying my invention; Fig. 2 is an enlarged detail sectional view of the connection for the exterior and interior parts of the container; Fig. 3 is an enlarged detail view of the bung and tap hole connection, and, Fig. 4 is an enlarged detail sectional view of a modified construction.

As will be seen from the drawing, I construct my improved beer keg of an inner shell A and an outer shell B spaced from each other so as to provide a space C, in which I propose to introduce a shock absorbing medium preferably in liquid form.

Each shell is divided into two sections, for instance the inner shell is composed of sections 1 and 2, while the outer shell is composed of sections 3 and 4. If desired, I may corrugate the outer section, as shown to the left in Fig. 1.

5 is an annular casting having an annular groove 6 and a screw-threaded flange 7. The edge of the section 3 of the outer shell is bent down into the annular groove 6 and secured therein by means of a steel band 8 which is shrunk into said annular groove, thereby firmly binding the casting to the edge of the section. There are two of these castings as shown in Fig. 2.

9 is a union having interior screw threads 10 constructed to engage the screw threads on the respective flanges of the castings 5, whereby the castings may be drawn together with a liquid proof joint. This union is provided with an annular shoulder or lug 11 having a countersink 12.

13 is a sleeve or collar provided with interior screw threads constructed to intermesh with the exterior screw threads 14 on the casting 9. This collar or sleeve 13 is provided with a shoulder or rib 15 having a countersink 16. The ends of the sections 1 and 2 of the inner shell are bent as shown in Fig. 2 and introduced between the shoulders or ribs 11 and 15 with a gasket 17 between them, said gasket forcing the edges of the sections in the countersinks 12 and 16 when the sleeve or collar 13 is screwed on the union 9.

The inner shell is enameled preferably on the exterior as well as the interior, while the outer shell is preferably galvanized. From the construction shown in Fig. 2, it will be seen that a substantially unbroken enameled surface is presented to the contents of the keg, inasmuch as the fastening means for the sections is located entirely without the inner shell.

A suitable bung and tap hole connection for a keg of this construction is shown in Fig. 3. From this figure, it will be seen that I form alined openings in the inner and outer shells in which exterior screw-threaded sleeves 18 and 19 are introduced, each sleeve being provided with an annular base ring or shoulder 20 and 21 respectively.

22' is a union positioned between the two shells and provided with interior screw threads constructed to intermesh with the screw threads of the sleeves 18 and 19, whereby the collars 20 and 21 are drawn toward the union, thereby clamping the edges of the metal around the alined openings between the union and said collars or flanges, there being a suitable washer 22 introduced in the joint, whereby a liquid proof joint is secured. In this construction, the inner faces of the sleeves 18 and 19, as well as the inner face of the ring 20, are enameled.

23 is a spacing member introduced between the heads of the inner and outer shells.

As will be seen from Fig. 2, the means for securing the sections of the respective shells together not only acts as a fastening means, but acts as a spacing member for the two shells.

The liquid shock absorber will preferably be of such character that it will not freeze. I attach considerable importance to the liquid shock absorber between the inner and outer shells to absorb the shock from dropping a keg, as I do not believe that a force could be great enough to entirely displace the liquid shock absorber in any given point opposite where the blow is struck, but, on the contrary, the liquid would be forced in all directions equalizing the blow on the inner shell, thereby protecting the enamel coating on the inner shell from rupture.

As will be seen from the construction shown and described, a keg constructed according to my invention may be disassembled quickly at any time for the purpose of examining the condition of the enamel lining on the inner shell, and if it be found that the enamel is ruptured or worn, it is an easy matter to detach either section of the inner shell and substitute another section while the damaged section is being re-enameled.

Considerable loss is sustained by large breweries from leakage from wooden kegs, all of which will be eliminated by the use of a keg constructed according to my invention.

In Fig. 4 I have shown a modified form of fastening means for securing the respective sections of the respective shells together, in which 24 is an outer shell and 25 the inner shell. 26 is an annular casting having an annular groove 27, in which the edge of one of the sections of the inner shell is bent. 28 is a steel band shrunk in said groove to secure the end of the section therein. The casting 26 is provided with an exterior screw thread 29 and an annular shoulder 31 having a countersink 30. 32 is an annular casting having an annular groove 33, in which the end of the other outer section is bent, into which it is secured by a steel band 28 shrunk therein. This casting 32 is provided with an interior screw thread adapted to intermesh with the screw thread 29 of the casting 26. 35 is an annular shoulder integral with the casting 32 having a countersink corresponding to the countersink 30. The ends of the two sections of the inner shell are introduced as shown in Fig. 4, between the shoulders 35 and 31 with a gasket between them and clamped between said shoulders by securing the casting 32 on the casting 26, as will be readily understood from the drawing. It will be seen that by this joint I also preserve a substantially unbroken enamel interior face for the inner shell and that the means for securing the sections of the shells together acts also as a spacing member, as described in connection with the other figures of the drawing.

While the water and the vitreous lining and coating of the inner shell serve in a measure as non-conductors of heat, I have deemed it expedient to further protect the contents of the keg from outside heat as it frequently happens that kegs of beer are left exposed to the rays of the sun for quite a period of time.

I introduce in the water between the two shells, granulated cork 35 in sufficient quantity to be distributed throughout the water on three sides of the keg, but not to completely fill the said space, so that when the keg is laid in the position shown in Fig. 1, the cork will float to the top and thus form a heat non-conducting strata held in suspension in the space between the shells as shown; there being no cork on the under side of the keg as that side is not exposed to the sun rays. Now if the keg is stood on one of its ends, the cork stratum will be disposed around the sides and over the top of the keg, but not on the bottom of the keg.

While the cork stratum held in suspension is primarily intended to serve as a non-conductor of heat, it is also intended to serve as a cushion or shock absorber for the water to prevent "water hammer." That is to say: When concussion is received on the outside shell, it is immediately communicated to and taken up by the water throughout its area. Now by introducing cork, I provide a cushion for the water as each piece of cork will be compressed commensurate with the pressure on the water and thus absorb the shock to a certain degree sufficient to prevent the water hammer "starting" any of the joints in the keg structure. Thus it will be seen that the cork stratum serves as a nonconductor of heat and acts as a cushion for the water.

I claim:—

1. A liquid container comprising an inner and an outer shell, each made in two pieces, means connecting the two pieces of each section and spacing the inner and outer shells apart, thereby forming a space between the inner and outer shells.

2. A liquid container comprising an inner and an outer shell, each made in two pieces, means connecting the two pieces of each section and spacing the inner and outer shells apart, thereby forming a space between the inner and outer shells, and a liquid shock absorber confined in the space between the inner and outer shells.

3. In a liquid container, the combination with an inner and an outer shell, each divided into two sections, of a combined spacing and connecting member securing the respective sections of the respective shells together with a liquid proof joint and spacing the shells from each other.

4. In a beer keg, the combination with an inner and an outer shell, each shell being divided into two sections, the sections of the inner shell being coated with enamel, of a combined spacing and connecting member securing the respective sections of the respective shells together with a liquid proof joint and spacing the shells from each other; the enameled inner sections when brought together presenting a continuous enamel surface on the inside of the keg which will not affect or be affected by the contents of the keg; said combined fastening and spacing member being bodily positioned outside the inner shell.

5. In a liquid container, the combination with an inner and an outer shell, each shell being divided into two sections, a screw-threaded annular casting secured to the edge of each section of the outer shell, an annular union having interior and exterior screw threads constructed to engage the screw-threaded castings of the outer sections and draw them together, and a screw-threaded annular collar constructed to engage screw threads on the outer face of the union, said collar being constructed to clamp the edges of the sections of the inner shell between it and the union with a liquid tight joint.

6. A liquid container comprising an inner and an outer shell, each made in two pieces, means connecting the two pieces of each section and spacing the inner and outer shells apart, thereby forming a space between the inner and outer shells, said combined fastening and spacing member being bodily positioned outside the inner shell.

7. In a liquid container, the combination with an inner and an outer shell, each shell being divided into two sections, a screw-threaded annular collar for each section and having an annular groove into which the edge of each section is bent, bands shrunk into said annular grooves to clamp the edges of said sections to said annular castings, a union having interior and exterior screw threads, said interior screw threads constructed to engage the screw threads of the castings of the respective sections and draw them together with a liquid proof joint, an annular shoulder on the outer face of said union, an annular collar having interior screw threads adapted to mesh with the exterior screw threads of the union and provided with an annular projection, the edges of the sections of the inner shell being introduced with a gasket between the annular projections of the collar and union, said collar being constructed to firmly clamp the said gasket and edges on the annular projection of the union with a liquid proof joint.

8. A liquid container comprising an inner and an outer shell spaced from each other, a liquid shock absorber confined in said space between the shells, and a strata of compressible material held in suspension in said liquid acting as a non-conductor of heat.

9. A liquid container comprising an inner and an outer shell spaced from each other, a liquid shock absorber confined in said space between the shells, and a strata of compressible material held in suspension in said liquid acting as a non-conductor of heat, and as a cushion for the shock absorber.

10. A liquid container comprising an inner and an outer shell spaced from each other, a liquid shock absorber confined in the space between the shells, and a strata of cork held in suspension in said liquid.

11. A liquid container comprising an inner and an outer shell spaced from each other, a liquid shock absorber confined in the space between the shells, and a granulated cork held in suspension in said liquid.

12. A liquid container comprising an inner and an outer shell, spaced from each other, a liquid shock absorber confined in said space between the shells, and a strata of inherently compressible material held in suspension in said liquid shock absorber and acting as a non-conductor of heat and as a cushion for the shock absorber.

The foregoing specification signed at Detroit, Michigan, this 18 day of April, 1912.

WILLIAM R. KINNEAR.

In presence of—
R. P. DRUMMOND,
F. J. WILLIAMS.